United States Patent [19]

Haller

[11] 3,844,619
[45] Oct. 29, 1974

[54] CUTTER DEVICES FOR USE IN MINERAL MINING

[75] Inventor: Herbert Haller, Gelsenkirchen-Buer, Germany

[73] Assignee: Gewerkschaft Eisenhutte Westfalia, Westfalia, Germany

[22] Filed: June 26, 1972

[21] Appl. No.: 266,148

Related U.S. Application Data

[63] Continuation-in-part of Ser. No. 244,791, April 17, 1972, abandoned.

[30] Foreign Application Priority Data

Apr. 30, 1971 Germany............................ 2121314

[52] U.S. Cl................................. 299/92, 37/142 A
[51] Int. Cl........................................... E21c 25/46
[58] Field of Search.......................... 299/79, 91–93

[56] References Cited
UNITED STATES PATENTS

| 2,996,291 | 8/1961 | Krekeler | 299/92 |
| 3,205,015 | 9/1965 | Krekeler | 299/92 |

Primary Examiner—Ernest R. Purser
Attorney, Agent, or Firm—Thompson, Birch, Gauthier & Samuels

[57] ABSTRACT

A cutter device for use with mining machines and consisting of a cutter member having a shank and a head portion extending generally transversely of the shank and a holder member with a recess in which the shank is received. The shank has a depression which locates a locking pin used to secure the cutter member to the holder member. The head portion of the cutter member has a cutting edge at one end and a projection at the opposite end. The holder member has a tapered neck extending upwardly from a wall surface penetrated by the recess to engage the projection and provide a support for the cutter member. The cutter member has a transition portion between the shank and the head portion and this portion has a surface co-extensive with a surface of the shank which surfaces engage similarly co-extensive surfaces of the neck and the interior of the recess. A shoulder can be formed beneath the cutting edge and spaced from an abutment surface on the holder member.

2 Claims, 6 Drawing Figures

PATENTED OCT 29 1974  3,844,619

CUTTER DEVICES FOR USE IN MINERAL MINING

CROSS REFERENCE TO RELATED APPLICATIONS

This application is a continuation-in-part of U.S. Pat. Application 244,791 filed Apr. 17, 1972 and now abandoned.

BACKGROUND TO THE INVENTION

The present invention relates to a cutter device for use in mining.

In mineral mining, machines used for cutting the mineral, particularly ripping machines, often employ cutters each of which effects its cutting operation in a direction transverse to the axis of the main body or shank of the cutter.

It is known to provide cutters composed of a cutter part proper and a holder which has a recess receiving the shank of the cutter part. The holder may be attached to a tool carrier. In this construction the cutting forces are transferred via the shank of the cutter part to the walls of the recess in the holder. Particularly where such cutters are employed with cutting wheels or rollers considerable forces have to be absorbed during the forward movement of the cutter whereas the forces produced during the return movement of the cutter are negligible. After a period of operation therefore, the walls of the recess suffer disproportionate wear and the recess becomes deformed.

Hitherto various attempts have been made to solve this problem but none of these measures has been wholly successful.

A general object of this invention is to provide an improved cutter device.

SUMMARY OF THE INVENTION

According to one aspect of the invention there is provided a cutter device for use in mining; said device comprising a cutter member and a holder member, the cutter member being formed with a shank and a head portion extending generally transversely relative to said shank, the head portion being provided with a cutting edge and a projection which is disposed opposite the cutting edge, and the holder member being formed with a recess for receiving the shank of the cutter member and a neck extending outwardly from a top surface adjoining one end of the recess, the neck being engageable with said projection to support the head portion of the cutter member.

Preferably the width of said neck in a direction transverse to said head portion is equal to or less than the width of a transition portion of the cutter member located between the head portion and the shank. In this way the cutting action of the device is unimpeded.

According to a further feature of the invention there may be additionally provided means for locking the shank within the recess. This locking means can conveniently take the form of a pin guided by a sleeve received in the holder member, the shank being formed with a depression which locates the free end of said pin. The neck may be of rectangular cross-section and preferably the neck tapers so as to have a progressively smaller cross-sectional area in the direction of the projection. In this way the cross-sectional area of the neck is at a minimum at its engagement with the projection of the head portion.

The neck may have a flat inner surface which is coplanar with an interior surface of the recess and said transition portion may have an outer surface which abuts said inner surface of the neck.

In a particularly suitable constructional version of the invention the cutter member shank has a rectangular cross-section and one of the narrow sides of the shank rests against a corresponding face of the recess. The transition portion of the cutter member may likewise have a surface co-extensive with said one side of the shank which engages the flat inner surface of the neck. The shank can nevertheless be given any other cross-sectional shape, for example oval, in which case the inner surface of the neck which faces towards the shank and the recess would be correspondingly curved.

The provision of the neck as a support for the cutter member ensures that the shank will have an adequate supporting surface situated opposite to the cutting edge of the cutter member. As the forces directed transversely to the axis of the shank and absorbed by the cutter member are considerably greater than the forces which are to be intercepted by the projection of the cutter head portion and which take the longitudinal direction of the shank, the neck provides a reliable means of preventing deformation or breakages of the holder member or of the cutter member itself.

In a further construction the invention provides a shoulder on the cutter member beneath the cutting edge which faces a complementary abutment surface on the holder member. Preferably a gap is provided between the shoulder and this abutment surface. This shoulder ensures that in the event of damage to the cutter member allowing the shank to move inwardly of the recess the resultant engagement between the shoulder and the abutment surface will limit this movement to prevent the cutter member from being jammed. The shoulder and abutment face thus provide a means for supporting the cutter member axially of the shank when required and ensure that even in the event of damage the cutter member can still be replaced. The shoulder can most conveniently be formed opposite the aforementioned outer surface of the transition portion.

The invention may be understood more readily and various other features of the invention may become more apparent from consideration of the following description.

BRIEF DESCRIPTION OF DRAWINGS

Embodiments of the invention will now be described, by way of example only, with reference to the accompanying drawings, wherein.

DESCRIPTION OF PREFERRED EMBODIMENT

Figure 1:
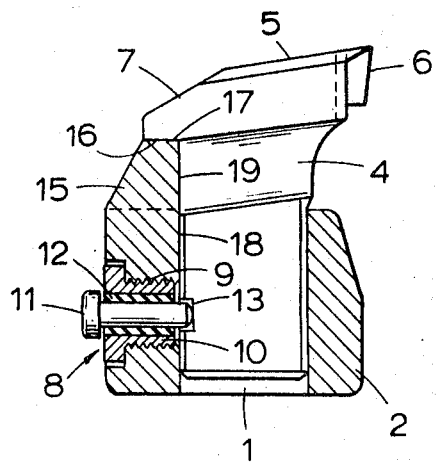
FIG. 1 is a sectional side view of a device made in accordance with the invention.
Figure 3:
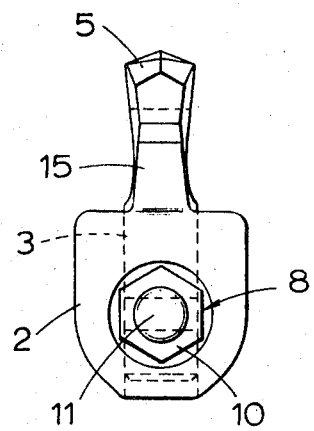
FIG. 3 is an end view of the device depicted in FIGS. 1 and 2.
Figure 2:
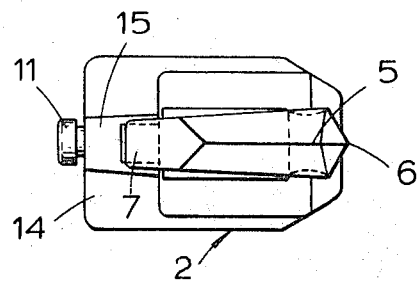
FIG. 2 is a plan view of the device depicted in FIG. 1.

As shown in FIGS. 1 to 3 of the drawings the device made in accordance with the invention is composed of two separate components namely a holder member 2 and a cutter member 4. The holder member 2 can be welded or otherwise attached to a tool carrier particularly a cutter wheel or roller of a mining machine. The holder member 2 is provided with a rectangular recess 1 extending through the main body of the member 2 and the cutter member 4 has a shank 3, also of rectangular cross-section, which is received within the recess 1. In another constructional form the recess 1 and the shank 3 may have an oval-shaped configuration and various other shapes are feasible. The cutter member 4 has a head portion 5 which extends generally transversely to the shank 3 and more particularly this head portion 5 is slightly inclined in relation to the shank 3. The head portion 5 is formed with a cutting edge 6 at one end and a projection 7 at the opposite end. The projection 7 extends over and is in engagement with an upstanding neck 15 formed at the upper face 14 of the holder member 2. This neck 15 is of rectangular cross-section and tapers in the upward direction laterally and rearwardly as shown in FIG. 2, so that the cross-section of the neck 15 becomes progressively smaller in an upward direction. The neck 15 has a planar upper surface 16 which engages with a planar lower surface 17 of the projection 7. Thus, the neck 15 is laterally small in size so as not to impede the cutting action effected by the device. The neck 15 has an inner surface 19 which is co-planar with the corresponding interior wall surface 18 of the recess laand bears against a rear surface of a transition portion of the cutter member 4 located between the head 5 and the shank 3.

Figure 5:
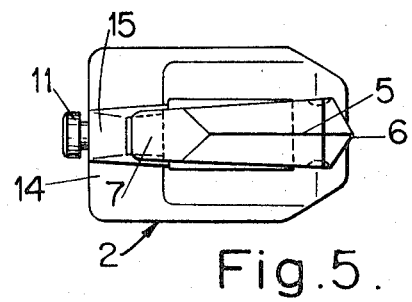
FIG. 5 is a plan view of the device depicted in FIG. 4.
Figure 4:
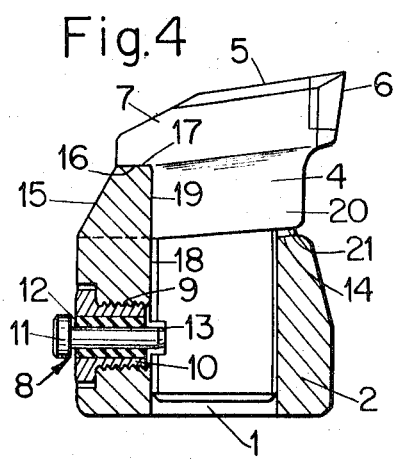
FIG. 4 is a sectional side view of a further device made in accordance with the invention.
Figure 6:
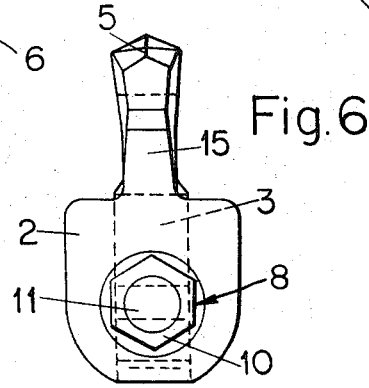
FIG. 6 is an end view of the device depicted in FIGS. 4 and 5.

The cutter member 4 is retained in the holder member 2 with the aid of locking means 8. This locking means 8 is composed of a threaded sleeve 10 received in a threaded bore extending transversely of the recess 1 and communicating therewith. The threaded bore adjoins an enlarged aperture at the exterior of the holder member 2 which receives a hexagonal head of the sleeve 10. A locking pin 11 extends through the sleeve 10 to engage a depression 13 in the facing surface of the shank 3. A rubber sleeve 12 is interposed between the pin 11 and the interior of the sleeve 10. Normally this construction is perfectly satisfactory and the provision of the neck 15 and the projection 7 readily takes up forces directed laterally of the longitudinal axis of the shank 3. However, in particularly unfavourable circumstances, for example where the cutter member 4 is incorrectly located and as a consequence the cutting edge 6 becomes damaged, it is possible for the forces directed axially of the shank 3 to become far higher. It is then possible for the projection 7 and/or the neck 15 to be damaged and even for the projection 7 to be broken off. The entire cutter member 4 can then be displaced inwardly of the recess 1 under said forces and become jammed therein. It is then difficult or even impossible to replace the damaged cutter member 4. FIGS. 4 to 6 depict a further embodiment of the invention which has means for overcoming this disadvantage. Insofar as the embodiments are very similar no detailed description of the embodiment shown in FIGS. 4 to 6 will be given other than to point out the differences between this embodiment and the previously described embodiment. In FIGS. 4 to 6 like reference numerals denote like parts to those shown and described in FIGS. 4 to 6 at the side of the cutter member 4 remote from the projection 7 there is provided a shoulder 20 disposed beneath the cutting edge 6 and generally formed at the transition portion between the shank 3 and the head portion 5. The shoulder 20 has a lower planar surface which is spaced from a complementary abutment surface 14 provided on the holder member 2 adjacent the side of the recess 1 remote from the surface 18. If the projection 7 should become damaged so as to allow the shank 3 to move inwards the surfaces 14, 21 will be brought into contact to limit the movement to the depth of the initial gap between the surfaces 14, 21. In this way the member 4 will not become jammed in the holder member 2 and the damaged cutter member 4 can be replaced without difficulty.

I claim:

1. A cutting device for use in mining, comprising: a cutter member having an elongated shank and a head portion connected to the upper end of said shank by a transition portion integral with both said shank and said head portions; said head portion extending transversely in relation to both said shank and transition portion, with a cutting edge protruding forwardly from one end thereof and a projection protruding rearwardly from the opposite end thereof; a holder member having a top surface with a recess therein, said recess being suitably dimensioned to receive said shank in an operative position with said transition portion protruding upwardly above said top surface; a neck tapering upwardly from the top surface of said holder member, the width of said neck in a direction transverse to said head portion being equal to or less than the width of said transition portion, said neck having an inner surface engageable with a rear surface of said transition portion, and an upper surface engageable with the underside of said projection at a plane which is spaced vertically above that of said top surface and adjacent to said cutting edge; and locking means in communication with said recess for engaging and retaining said shank in said operative position.

2. The device as claimed in claim 1 wherein said locking means is comprised of a pin guided by a sleeve received in said holder member, said shank being formed with a depression for receiving the free end of said pin.

* * * * *